United States Patent [19]

Nishii et al.

[11] Patent Number: 4,874,207
[45] Date of Patent: Oct. 17, 1989

[54] HYDRAULIC BRAKING SYSTEM FOR AN AUTOMOTIVE VEHICLE

[75] Inventors: Michiharu Nishii; Masamoto Ando, both of Toyota; Yoshihiko Tada, Aichi, all of Japan

[73] Assignee: Aisin Seiki Kabushiki Kaisha, Kariya, Japan

[21] Appl. No.: 214,373

[22] Filed: Jun. 27, 1988

[30] Foreign Application Priority Data

| Jun. 27, 1987 | [JP] | Japan | 62-160113 |
| Aug. 13, 1987 | [JP] | Japan | 62-202249 |
| Aug. 13, 1987 | [JP] | Japan | 62-202252 |
| Aug. 13, 1987 | [JP] | Japan | 62-202253 |

[51] Int. Cl.$^4$ ............................... B60T 8/44
[52] U.S. Cl. ............................... 303/52; 60/547.1; 60/555; 60/565; 60/574; 188/358; 303/6.01; 303/10; 303/114; 303/116; 303/119
[58] Field of Search ............................... 303/113–119, 303/10, 13, 6.01, 9.61, 100, 92, 52; 188/355–360, 345; 60/547.1, 548, 545, 555, 574, 563, 562, 581, 576, 561, 557, 560, 565, 566, 556

[56] References Cited

U.S. PATENT DOCUMENTS

| 3,431,028 | 3/1969 | Yoder. |
| 3,521,934 | 7/1970 | Leiber. |
| 3,659,905 | 5/1972 | Goulish. |
| 3,722,960 | 3/1973 | von Lewis of Menar. |
| 3,746,402 | 7/1973 | Hickner et al.. |

(List continued on next page.)

FOREIGN PATENT DOCUMENTS

| 2363619 | 7/1974 | Fed. Rep. of Germany. |
| 2444765 | 4/1976 | Fed. Rep. of Germany. |
| 2519835 | 11/1976 | Fed. Rep. of Germany. |
| 3420687 | 5/1985 | Fed. Rep. of Germany. |
| 46-28944 | 8/1971 | Japan. |
| 49-28307 | 7/1974 | Japan. |
| 56-10219 | 3/1981 | Japan. |
| 56-142733 | 11/1981 | Japan. |
| 57-172863 | 10/1982 | Japan. |
| 61-222850 | 10/1983 | Japan. |
| 58-199258 | 11/1983 | Japan. |
| 59-227552 | 12/1984 | Japan. |
| 60-25834 | 2/1985 | Japan. |
| 60-25835 | 2/1985 | Japan. |
| 60-38243 | 2/1985 | Japan. |
| 60-71359 | 4/1985 | Japan. |
| 62-187638 | 8/1987 | Japan. |
| 62-187640 | 8/1987 | Japan. |
| 62-191260 | 8/1987 | Japan. |
| 2056606 | 3/1981 | United Kingdom. |
| 22141195 | 12/1984 | United Kingdom. |
| 2168771 | 6/1986 | United Kingdom. |
| 2175362 | 11/1986 | United Kingdom. |

OTHER PUBLICATIONS

Heinz Leiber et al., "Antilock System for Passenger Car with Digital Electronics–Design and Operation" 1979.

*Primary Examiner*—Douglas C. Butler
*Attorney, Agent, or Firm*—Burns, Doane, Swecker & Mathis

[57] ABSTRACT

A hydraulic braking system for an automotive vehicle having a power source for generating a hydraulic power pressure, a reservoir, a master cylinder, a regulator and a plurality of wheel brake cylinders for braking respective road wheels, which are divided into a first group of wheel brake cylinders communicated with the master cylinder and a second group of wheel brake cylinders communicated with the regulator. The regulator has a housing defining therein a regulator chamber for introducing the hydraulic power pressure thereinto from the power source and regulating the hydraulic power pressure into a regulated hydraulic pressure in response to the hydraulic braking pressure generated in the master cylinder, and which is positioned in substantially coaxial relationship with the master cylinder and responsive mechanically to depression of a brake pedal. Accordingly, the regulator normally generates the regulated hydraulic pressure in response to the hydraulic braking pressure generated in the master cylinder, whereas it generates a hydraulic pressure in response to depression of the brake pedal when the hydraulic braking pressure is less than a predetermined value.

16 Claims, 5 Drawing Sheets

U.S. PATENT DOCUMENTS

| | | |
|---|---|---|
| 3,763,600 | 8/1973 | Gemmellaro . |
| 3,787,094 | 1/1974 | Harned et al. . |
| 3,801,161 | 4/1974 | Sharp . |
| 3,844,623 | 10/1974 | Parsons et al. . |
| 3,848,934 | 11/1974 | Grosseau . |
| 3,877,756 | 4/1975 | Inada et al. . |
| 3,905,655 | 9/1975 | de Gennes . |
| 3,975,061 | 8/1976 | Kondo et al. . |
| 4,027,922 | 6/1977 | Schlicker ............... 303/52 X |
| 4,036,534 | 7/1977 | Kondo et al. . |
| 4,050,748 | 9/1977 | Belart . |
| 4,116,495 | 9/1978 | Belart . |
| 4,129,341 | 12/1978 | Pauwels . |
| 4,138,165 | 2/1979 | Blomberg et al. . |
| 4,254,623 | 3/1981 | Dauvergne ............... 60/556 X |
| 4,312,182 | 1/1982 | Filderman ............... 60/556 X |
| 4,415,210 | 11/1983 | Belart et al. . |
| 4,449,369 | 5/1984 | Dauvergne ............... 60/556 |
| 4,453,782 | 6/1984 | Arikawa et al. . |
| 4,492,414 | 1/1985 | Kozakai et al. . |
| 4,526,426 | 7/1985 | Sato et al. . |
| 4,552,413 | 11/1985 | Fujii et al. . |
| 4,565,411 | 1/1986 | Seiber . |
| 4,578,951 | 4/1986 | Belart et al. . |
| 4,597,611 | 7/1986 | Nishimura et al. . |
| 4,602,824 | 7/1986 | Nishimura et al. . |
| 4,605,263 | 8/1986 | Ando et al. . |
| 4,618,189 | 10/1986 | Nakanishi et al. . |
| 4,620,750 | 11/1986 | Leiber . |
| 4,624,508 | 11/1986 | Adachi et al. . |
| 4,636,008 | 1/1987 | Adachi et al. . |
| 4,636,010 | 1/1987 | Adachi et al. . |
| 4,641,895 | 2/1987 | Belart et al. . |
| 4,652,061 | 3/1987 | Nishimura et al. . |
| 4,655,509 | 4/1987 | Ando et al. . |
| 4,660,899 | 4/1987 | Ando et al. . |
| 4,674,805 | 6/1987 | Leiber . |
| 4,678,243 | 7/1987 | Leiber . |
| 4,685,747 | 8/1987 | Belart et al. . |
| 4,703,979 | 11/1987 | Nakanishi et al. . |
| 4,715,666 | 12/1987 | Farr . |
| 4,728,155 | 3/1988 | Resch . |
| 4,730,879 | 3/1988 | Adachi et al. . |
| 4,750,329 | 6/1988 | Horiuchi et al. . |
| 4,750,788 | 6/1988 | Seibert et al. . |
| 4,754,604 | 7/1988 | Flory ............... 60/565 |
| 4,754,605 | 7/1988 | Seibert et al. . |

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system which comprises, in addition to a master cylinder, a regulator operatively connected to the master cylinder for regulating a hydraulic power pressure supplied from a power source to a regulated hydraulic pressure in response to operation of the master cylinder and applying the regulated hydraulic pressure to wheel brake cylinders.

2. Description of the Prior Art

In conventional service braking systems for an automotive vehicle, there are provided a plurality of hydraulic circuits connecting wheel brake cylinders mounted on road wheels with a hydraulic braking pressure generator such as a master cylinder, so that when one of the hydraulic circuits is broken, braking operation is achieved by the rest of the hydraulic circuits. In general, a tandem master cylinder is used in a conventional dual circuits system.

In order to reduce the force required to operate a brake pedal in braking operation, the hydraulic braking system is provided with a servo unit which is referred as a servo or a booster and which utilizes compress air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal. It has been proposed to employ the hydraulic booster, in the hydraulic braking system, as a dynamic hydraulic braking pressure generator in addition to the master cylinder. In other, words a hydraulic pressure boosted by the booster (hereinafter referred to as boost pressure) in response to depression of the brake pedal is applied directly to a hydraulic circuit. For example, as shown in Japanese Patent Laid-open Publication No. Sho 57-172863 or Sho 59-227552, boost pressure of the hydraulic booster is applied to rear wheel brake cylinders in a front-rear dual circuits system in order to reduce the stroke of the brake pedal.

However, in this prior hydraulic braking system, since the hydraulic pressure in the hydraulic booster, i.e., boost pressure, is applied directly to the wheel brake cylinder in one hydraulic circuit, it is necessary to be adjusted with the hydraulic braking pressure generated from the master cylinder in the other hydraulic circuit in view of the distribution of the braking force applied to road wheels. At the same time, in this hydraulic booster, a servo operation to the master cylinder has to be achieved. Accordingly, there are many requisites in designing not only the hydraulic booster but also the master cylinder, so that it manufacturing cost becomes high.

In accelerating operation of the above hydraulic braking system, it is necessary to prevent a slip on driven wheels of the road wheels, for providing an optimum accelerating performance. For this purpose, a connecting valve is disposed in a hydraulic passage connecting the hydraulic braking pressure generator to the wheel brake cylinders provided on the driven wheels, at a position upstream of valve means for controlling the communication between the hydraulic pressure generator and the wheel brake cylinders and the communication between a reservoir and the wheel brake cylinders, as disclosed in U.S. Pat. No. 4,565,411.

According to the hydraulic braking system described above, the road wheels are prevented from locking in braking operation by suitably controlling the hydraulic braking pressure applied to the wheel brake cylinders by means of the valve means, and the slip of the driven wheels is prevented in starting or accelerating operation by means of the valve means and the connecting valve which normally interrupts the flow between the wheel brake cylinders of the driven wheels and a pressure accumulator, i.e. the power source.

However, in the above braking system, since the connecting valve is disposed at a position upstream of the valve means, it is difficult to install the connecting valve and arrange the necessary piping for providing the anti-slip operation in a braking system already equipped with the valve means for the anti-locking operation. Further, in the case where the driven wheels are rear road wheels, a hydraulic pressure from the power source is applied to the valve means through a regulator valve such as a proportioning valve so that the hydraulic pressure to be controlled by the valve means is decreased.

SUMMARY OF THE INVENTION

Accordingly, it is an object of the present invention to provide a hydraulic braking system for an automotive vehicle wherein a stroke for depressing a brake pedal is shortened without causing an increase in manufacturing cost, or an increase in size.

It is another object of the present invention to provide a hydraulic braking system having a master cylinder and a regulator which generates a regulated hydraulic pressure in response to operation of the master cylinder and applies the pressure to wheel brake cylinders.

It is further object of the present invention to provide a hydraulic braking system having a master cylinder and a regulator which generates a regulated hydraulic pressure in advance to the master cylinder.

It is yet a further object of the present invention to provide a hydraulic braking system having a master cylinder and a regulator wherein an anti-locking operation and an anti-slip operation are effectively achieved in connection with operation of the regulator.

In accomplishing these and other objects, a hydraulic braking system for an automotive vehicle according to the present invention comprises a power source for generating a hydraulic power pressure, a reservoir for storing an amount of hydraulic fluid, a master cylinder which has a housing defining therein a bore in which a master piston is slidably disposed to form a pressure chamber for introducing the hydraulic fluid thereinto from the reservoir and generating a hydraulic braking pressure in response to depression of a brake pedal, a regulator which has a housing defining therein a regulator chamber for introducing the hydraulic power pressure thereinto from the power source and regulating the hydraulic power pressure into a regulated hydraulic pressure in response to the hydraulic braking pressure generated in the master cylinder, and which is positioned in substantially coaxial relationship with the master cylinder and responsive mechanically to depression of the brake pedal, and a plurality of wheel brake cylinders for braking respective road wheels, which are divided into a first group of wheel brake cylinders communicated with the pressure chamber of the master cylinder and a second group of wheel brake cylinders communicated with the regulator chamber.

In the above-described hydraulic braking system, the regulator is preferably arranged to control the communication of the regulator chamber with the power source and the reservoir normally in response to the hydraulic braking pressure generated in the master cylinder, and in response to depression of the brake pedal when the hydraulic braking pressure generated in the master cylinder is less than a predetermined value.

In the above arrangement, the hydraulic braking system according to the present invention may further comprise a control piston which is slidably disposed between the regulator chamber of the regulator and the pressure chamber of the master cylinder, and which is applied at one end with a hydraulic pressure in the regulator chamber and at the other end with the hydraulic braking pressure in the master cylinder, so that the control piston disconnects the fluid communication between the regulator and the master cylinder.

The hydraulic braking system according to the present invention in the above arrangement may further comprise a changeover valve selectively placed in one of a first operating position for communicating the first group of wheel brake cylinders with the pressure chamber and a second operating position for communicating the first group of wheel brake cylinders with the regulator chamber and blocking the communication between the first group of wheel brake cylinders and the pressure chamber.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
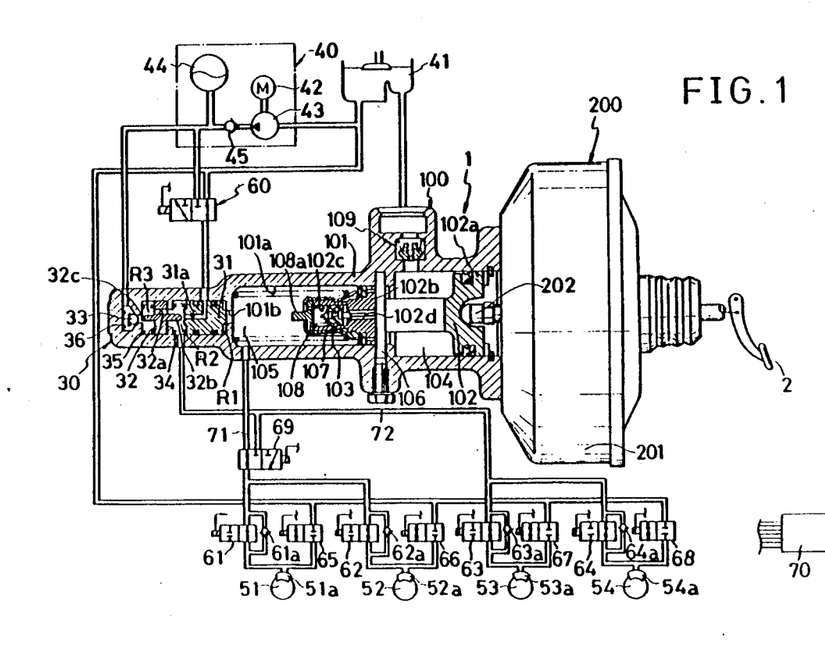
FIG. 1 is a schematic illustration of a hydraulic braking system of a first embodiment of the present invention with a sectional view of a hydraulic pressure generator thereof.

Referring to FIG. 1, there is schematically illustrated a hydraulic braking system which includes a hydraulic pressure generator (hereinafter referred to simply as pressure generator) 1, a regulator 30 and a power source 40. The pressure generator 1 comprises a master cylinder 100 and a vacuum booster 200 of a well known type.

The vacuum booster 200 has a housing 201 defining therein a chamber which is divided by a diaphragm into a constant pressure chamber normally applied with a vacuum and a variable pressure chamber selectively communicated with the constant pressure chamber or the atmosphere by a control valve mechanism which is activated by a brake pedal 2. Accordingly, a pressure difference between the two chambers is generated in response to depression of the brake pedal 2, and a piston 102 of the master cylinder 100 is boosted by the pressure difference through an output rod 202.

The master cylinder 100 is a known portless single master cylinder and so called fast-fill master cylinder which comprises a cylinder body 101 defining therein a stepped bore 101a and a piston 102 having a large-diameter portion 102a and a small-diameter portion 102b which is fluid-tightly and slidably disposed within the stepped bore 101a which is divided into a fluid chamber 104 and a power chamber 105 through the piston 102. In the small-diameter portion 102b of the piston 102, there is formed a stepped bore of a large-diameter bore 102c and a small-diameter bore 102d within which a valve mechanism 103 is disposed. The valve mechanism 103 comprises a valve member to be seated on a stepped portion in the large-diameter bore 102c with a rod slidably inserted into the small-diameter bore 102d, and a spring biasing the valve member toward the stepped portion so as to block the communication between the fluid chamber 104 and the pressure chamber 105. The piston 102 is formed in its approximately middle portion with an elongated hole through which a stopper pin 106 secured to the cylinder body 101 penetrates.

Accordingly, when the piston 102 is in its initial position as shown in FIG. 1, the rod of the valve mechanism 103 contacts with the stopper pin 106 to hold the valve member away from the stepped portion in the stepped bore, so that the pressure chamber 105 communicates with the fluid chamber 104 though the large-diameter bore 102c and the small-diameter bore 102d. When the piston 102 is moved leftward in FIG. 1, the rod departs from the stopper pin 106 and the valve member seats on the stepped portion, so that the communication between the fluid chamber 104 and the pressure chamber 105 is blocked to generate a hydraulic braking pressure in the pressure chamber 105. The fluid chamber 104 is communicated with the reservoir 41 through a check valve 109 and a pressure chamber 105 is communicated with wheel brake cylinders 51a, 52a disposed on front road wheels 51, 52 respectively through a hydraulic pressure passage (hereinafter referred to simply as passage) 71. At a top end portion of the small-diameter portion 102b of the piston 102, a retainer 107 is fixedly secured by caulking or other securing means with a plunger 108 having a protrusion 108a which extends into the pressure chamber 105 through a hole formed in the bottom of the retainer 107.

At the left side of the master cylinder 100 in FIG. 1, a regulator 30 is disposed in coaxial relationship with the stepped bore 101a of the master cylinder 100. The regulator 30 requires the hydraulic power pressure supplied from the power source 40 into a regulated hydraulic pressure which is substantially equal to the hydraulic braking pressure within the pressure chamber 105 which is applied to the regulator 30 through a hole 101b formed in the center of the bottom portion of the stepped bore 101a, and applies the regulated hydraulic pressure to wheel brake cylinders 53a, 54a disposed on rear wheels 53, 54 respectively.

The regulator 30 comprises a cylinder body or housing integral with the cylinder body 101 having four ports, a piston 31 fluid-tightly and slidably disposed within a bore defined in the housing, a plunger 32 axially slidably disposed within the housing, a spherical valve member 33 accommodated in the housing and actuated by the plunger 32 to supply the hydraulic power pressure into the bore of the housing from the power source 40, and springs 34, 35 and 36. The housing of the regulator 30 may be made seperately from the cylinder body 101 and secured thereto. The piston 31 and the plunger 32 define three chambers R1, R2 and R3 in the bore of the regulator 30. The chamber R1 is applied with the hydraulic braking pressure in the pressure chamber 105. The chamber R2 communicates with the reservoir 41 through a passage 31a formed in the piston 31. The chamber R3 communicates with the chamber R2 through a passage 32a formed in the plunger 32. The plunger 32 has a protrusion 32b formed integrally at its one end facing the open end of the passage 31a of the piston 31 for blocking the communication between the chamber R2 and the reservoir 41, and a protrusion 32c formed integrally at its other end facing a partition wall defining the chamber R3 which is formed with a hole on which the spherical valve member 33 is seated. When the plunger 32 is moved toward the partition wall in accordance with the leftward movement of the piston 31 in FIG. 1, the protrusion 32c extends through the hole for abutting contact with the spherical valve member 33 and advancing it against a biasing force by the spring 36 which biases the spherical valve member 33 toward the hole to be seated thereon. The plunger 32 is biased toward the piston 31 by the spring 35 and blocked by a flange portion formed within the bore of the regulator 30, so that the protrusions 32b, 32c of the plunger 32 are normally held away from the passage 31a and the spherical valve member 33 respectively. The spring 34 is mounted on the flange portion and biases the piston 31 toward the pressure chamber 105.

In operation of the regulator 30, when the hydraulic pressure in the chamber R1 exceeds the hydraulic pressure in the chambers R2, R3, the piston 31 is moved toward the plunger 32 so that the protrusion 32b of the plunger 32 seats on the open end of the passage 31a of the piston 31. Then, the plunger 32 and the piston 31 with its passage 31a closed by the protrusion 32b are moved in united fashion toward the spherical valve member 33 which is moved away from the hole of the partition wall by the protrusion 32c. Accordingly, the hydraulic power pressure is supplied from the power source 40 into the chambers R2, R3 and the hydraulic pressure therein increases.

On the contrary, when the hydraulic pressure in the chambers R2, R3 exceeds that in the chamber R1, the piston 31 is moved toward the pressure chamber 105 so that the spherical valve member 33 is seated on the hole and then the passage 31a is open. Accordingly, the hydraulic pressure in the chambers R2, R3 is exhausted to the reservoir 41 through the passage 31a, and the hydraulic pressure in the chambers R2, R3 is reduced. Thus, the regulator 30 applies a regulated hydraulic pressure, which is approximately equal to the hydraulic braking pressure in the master cylinder 100, to the wheel brake cylinders 53a, 54a through a passage 72. The hole 101b formed in a wall between the chamber R1 and the pressure chamber 105 has an inner diameter larger than an outer diameter of the protrusion 108a of the plunger 108, so that the protrusion 108a may abut on the piston 31 and advance it toward the spherical valve member 33 when the hydraulic braking pressure is decreased to a value less than a predetermined value.

The power source 40 comprises an accumulator 44 for generating a hydraulic power pressure along with a fluid pump 43 which is connected to the accumulator 44 via a check valve 45 and connected to the reservoir 41 which stores an amount of hydraulic fluid. The fluid pump 43 is operated by a motor 42 which is actuated by an electric control signal from an electric control device (hereinafter referred to as controller) 70.

A changeover valve 60 of a three ports-two positions solenoid operated directional control valve is disposed between the power source 40 and the regulator 30. A first port of the changeover valve 60 is connected to the reservoir 41, its second port is connected to the regulator 30 and its third port is connected to the accumulator 44. The changeover valve 60 is selectively placed in one of a first operating position and a second operating position. In the first operating position or its normal position, the first port and the second port are communicated with each other and the third port is closed, so that the regulator 30 is communicated with the reservoir 41 when the brake pedal 2 is not depressed. In the second operating position, the first port is closed and the regulator 30 is held in communication with the accumulator 44, even when the brake pedal 20 is not depressed. The solenoid of the changeover valve 60 is energized in response to the electric control signal from the controller 70 when the brake pedal 2 is not depressed. In an inoperative condition of the changeover valve 60 (i.e. where its solenoid is not energized), therefore, the changeover valve 60 is placed in the first operating position, whereas in its operative condition (i.e., where its solenoid is energized), it is placed in the second operating position. Accordingly, in the inoperative condition of the changeover valve 60 when the brake pedal 2 is not depressed, the chamber R2 is communicated with the reservoir 41.

The chamber R2 of the regulator 30 is communicated with the wheel brake cylinders 53a, 54a, through two ports-two positions solenoid operated valves for supplying the hydraulic pressure (hereinafter referred to simply as supply valves) 63, 64 respectively. The supply valve 63 is provided together with a check valve 63a in the passage 72 connecting the chamber R2 to the wheel brake cylinder 53a. In its inoperative condition, the chamber R2 and the wheel brake cylinder 53a are communicated with each other. In its operative condition, the communication between the chamber R2 and the wheel brake cylinder 53a is blocked. The supply valve 64 is provided together with a check valve 64a in the passage 72, and functions in the same manner as the supply valve 63.

The pressure chamber 105 of the master cylinder 100 is communicated with the wheel brake cylinders 51a, 52a, through supply valves 61, 62 respectively and a changeover valve 69. The supply valve 61 is provided together with a check valve 61a in a passage connecting the changeover valve 69 to the wheel brake cylinder 51a. In its inoperative condition, the changeover valve 69 and the wheel brake cylinder 51a are communicated with each other. In its operative condition, the communication between the changeover valve 69 and the wheel brake cylinder 51a is blocked. The supply valve 62 is provided together with a check valve 62a in a passage connecting the changeover valve 69 to the wheel brake cylinder 52a, and functions in the same manner as the supply valve 61. The supply valves 61 to 64 are operated in response to the electric control signal from the controller 70.

The wheel brake cylinders 51a to 54a are connected to the reservoir 41 through two ports-two positions solenoid operated valves for discharging the hydraulic pressure from the wheel brake cylinders (hereinafter referred to as discharge valves) 65 to 68 respectively. The discharge valves 65 to 68 are operated in response to the electric control signal from the controller 70. In the operative condition of the discharge valve 65, the wheel brake cylinder 51a and the reservoir 41 are communicated with each other, whereas the communication therebetween is blocked in its inoperative condition, and other discharge valves 66, 67 and 68 function as well.

The changeover valve 69 is a three ports-two positions solenoid operated directional control valve arranged to be energized in response to the electric control signal from the controller 70. A first port of the changeover valve 69 is connected to the pressure chamber 105 through the passage 71, its second port is connected to the supply valves 61, 62 and its third port is connected to the chamber R2. The changeover valve 69 is selectively placed in one of a first operating position and a second operating position. In its first operating position or its normal position, the first port and the second port are communicated with each other and the third port is closed, so that the pressure chamber 105 is communicated with the wheel brake cylinders 51a, 52a through the supply valve 61, 62 respectively. In the second operating position, the chamber R2 is communicated with the wheel brake cylinders 51a, 52a. The solenoid of the changeover valve 69 is controlled to be energized prior to the operation of the discharge valves 65, 66 operated in the anti-locking operation, which is described later, so that the brake pedal 2 is held in a position at the time of initiation of braking during the anti-locking operation, so as to prevent an excessive depression of the brake pedal 2.

In operation, when the brake pedal 2 is depressed, the output rod 202 of the vacuum booster 200 is moved toward the regulator 30 so that the piston 102 of the master cylinder 100 is moved in the same direction, and the pressure chamber 105 is closed by the valve mechanism 103. Accordingly, the hydraulic braking pressure is generated in the pressure chamber 105 in response to depression of the brake pedal 2. At the same time, the piston 31 of the regulator 30 is moved toward the spherical valve member 33 by the hydraulic braking pressure in the pressure chamber 105, so that the regulated hydraulic pressure, which is approximately the same as the hydraulic braking pressure in the pressure chamber 105, is generated in the chambers R2, R3. These regulated hydraulic pressures in the regulator 30 and the hydraulic braking pressure in the pressure chamber 105 are applied to the respective wheel brake cylinders 51a to 54a thereby to brake the front and rear road wheels 51 to 54.

In the case where the pressure chamber 105 of the master cylinder 100 has some defects in sealing, or the brake fluid leaks from the passage 71 for some reason, the pressure chamber 105 will not generate the hydraulic braking pressure, but the piston 102 will move to the bottom of the cylinder body 101. In this case, however, since the protrusion 108a of the plunger 108 secured to the piston 102 abuts on the piston 31 of the regulator 30 and presses the same, a hydraulic pressure is generated in the chambers R2, R3 in response to depression of the brake pedal 2, so that this hydraulic pressure is applied to the wheel brake cylinders 53a, 54a of the rear road wheels 53, 54 to be braked. Thus, the braking operation is maintained even when the brake fluid is leaked from the master cylinder 100 or its downstream portion.

In connection with operation of the controller 70, operation of the hydraulic braking system according to the above embodiment is described below.

At the outset, where the brake pedal 2 is depressed in braking operation, the changeover valve 60 is held in its inoperative position.

When the road wheels 51 to 54 are not in a particular locking condition, the changeover valve 69, the supply valves 61 to 64 and the discharge valves 65 to 68 are in their inoperative conditions as shown in FIG. 1. The master cylinder 100 is operated in response to depression of the brake pedal 2 to generate from the pressure chamber 105 the hydraulic braking pressure which is applied to the wheel brake cylinders 51a, 52a. Accordingly, the hydraulic pressure in the chamber R2 is regulated, in response to the hydraulic braking pressure in the master cylinder 100, into the regulated hydraulic pressure which is applied to the wheel brake cylinders 53a, 54a.

When some of the road wheels 51 to 54 are in a particular locking condition, the changeover valve 69 is operated to be placed in its second operating position and then the supply valves 61 to 64 and the discharge valves 65 to 68 are operated by the controller 70 depending on the locking condition, so that the hydraulic pressure in each of the wheel brake cylinders 51a to 54a is increased or decreased to effectively prevent the road wheels 51 to 54 from locking. Accordingly, the anti-locking operation is achieved.

In the case where the brake pedal 2 is not depressed, the hydraulic braking system of the above embodiment operates as follows:

When the changeover valve 60 is in its inoperative condition, no hydraulic pressure is applied to any of the wheel brake cylinders 51a 54a.

When the driven wheels of the road wheels 51 to 54 are in the slip condition in starting or accelerating operation, the changeover valve 60 is operated to be placed in its second operating position and the supply and discharge valves are operated by the controller 70 depending on the slip condition of the driven wheels, so that only driven wheels are braked without depression of the brake pedal 2, effectively preventing the slip. Accordingly, the anti-slip operation is achieved. For example, where the road wheels 53, 54 are rear driven wheels, the anti-slip operation may be obtained by rendering the changeover valve 60 operative, and operating the discharge valves 67 and 68 (the supply valves 63 and 64 as well, if necessary) depending upon the slip condition. Where the road wheels 51, 52 are front driven wheels, the anti-slip operation may be obtained by rendering the changeover valves 60, 69 and the supply valves 63, 64 operative (the discharge valves 67 and 68 as well, if necessary) and operating the discharge valves 65, 66 (the supply valves 61 and 62 and the changeover valve 69 as well, if necessary) depending upon the slip condition. Where all the road wheels 51 to 54 are driven wheels, it may be obtained by rendering the changeover valves 60, 69 operative and operating the discharge valves 65 to 68 (the supply valves 61 to 64 as well, if necessary) depending upon the slip condition.

Further, when an obstacle is sensed by a sensor (not shown) during the driving of the vehicle, the changeover valves 60, 69 (the supply and discharge valves 61 to 68 as well, if necessary) may be operated suitably by the controller 70 in response to the signal from the sensor, so that a suitable hydraulic pressure is applied to all the wheel brake cylinders 51a to 54a to accurately stop the vehicle without depression of the brake pedal 2. That is, an auto-braking operation may be achieved.

As is apparent from the foregoing, the hydraulic booster is not necessarily needed in the hydraulic braking system of the above embodiment since the master cylinder 100 is disposed in one of the dual hydraulic circuits, and the regulator 30 is disposed in the other circuit and operated in response to the hydraulic pressure in the pressure chamber 105 or depression of the brake pedal 2. Therefore, any vacuum boosters may be employed in the above system out of those used commonly in other conventional braking systems, so that the stroke of the brake pedal in the above system is shortened compared to the prior systems without an increase in its manufacturing cost. With the stroke of the brake pedal shortened, the master cylinder 100 may be small in its inner diameter, so that the booster may be small in size. Consequently, the braking system as a whole is made small in size. Further, a hydraulic pressure may be applied to all the wheel brake cylinders 51a to 54a without depression of the brake pedal 2 by operating the changeover valve 60 in the above system. Therefore, even in the case of a vehicle adopting the diagonal dual circuit, or irrespective of the driven wheels, the above system may be employed commonly without changing any of the components. In the above embodiment, a three ports-two positions solenoid operated directional control valve is adopted as each of the changeover valves 60, 69. However, these changeover valves 60, 69 may be replaced by two sets of two ports-two positions solenoid operated shut-off valves respectively.

Figure 2:
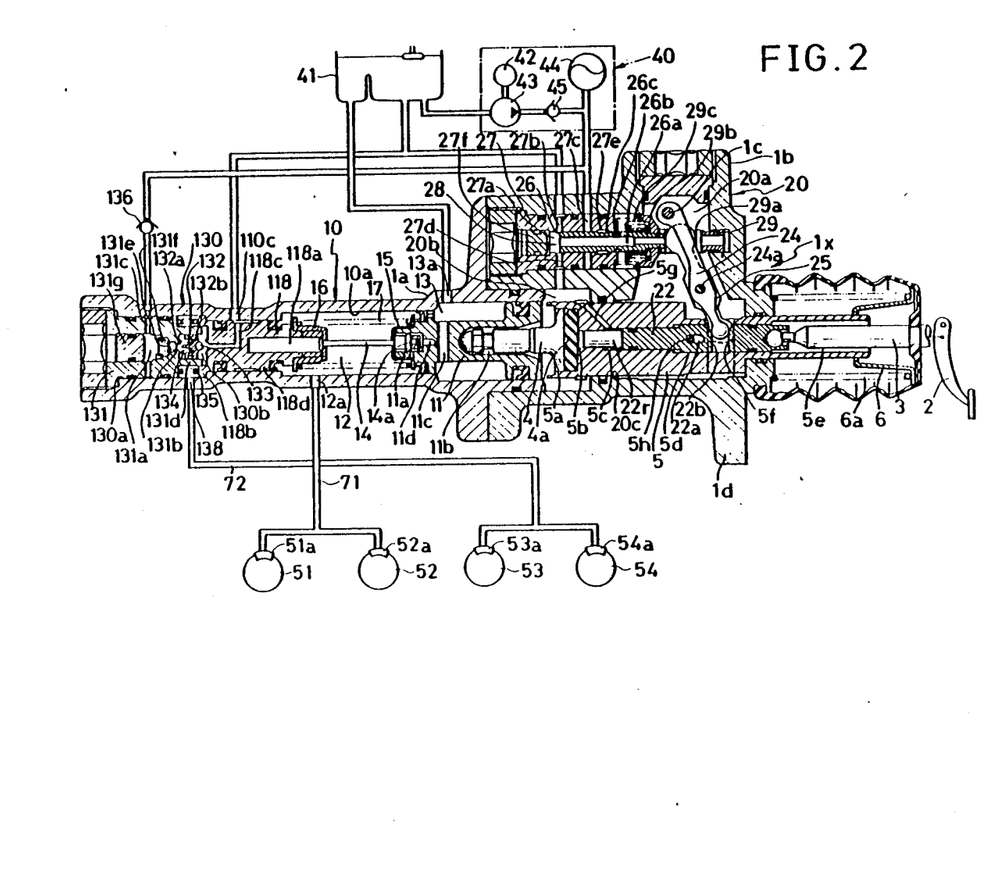
FIG. 2 is a schematic illustration of a hydraulic braking system of a second embodiment of the present invention with a sectional view of a hydraulic pressure generator thereof.

FIG. 2 shows a second embodiment of the present invention in which the pressure chamber 1x comprises a master cylinder 10, a hydraulic booster 20, and a regulator 130. A depressing force applied on the brake pedal 2 is transmitted as a braking force to an input rod 3, and in response to this braking force, a hydraulic pressure introduced from the power source 40 or the reservoir 41 is appropriately regulated and applied to the wheel brake cylinders 51a to 54a of the front and rear road wheels 51 to 54.

The master cylinder 10 is connected to the regulator 130 in series, and a master piston 11 is fluid-tightly and slidably disposed in a cylinder bore 10a formed in a housing 1a. The master piston 11 has a small-diameter portion and a large-diameter portion, and the cylinder bore 10a is formed as a stepped bore having corresponding small-diameter and large-diameter portions. In the large-diameter portion of the cylinder bore 10a, a fluid chamber 13 is defined between the small-diameter portion and the large-diameter portion of the master piston 11, and in the small-diameter portion of the cylinder bore 10a, a pressure chamber 12 is defined between the small-diameter portion of the master piston 11 and a control piston 118. The pressure chamber 12 is communicated with the passage 71 via a port 12a, and the fluid chamber 13 is communicated with the reservoir 41 via a port 13a.

The control piston 118 is disposed between the master cylinder 10 and the regulator 130, and is fluid-tightly and slidably disposed in a bore 118d which is smaller in diameter than the cylinder bore 10a communicated therewith. The control piston 118 has a hole 118a formed axially at its one end facing the pressure chamber 12 and has on its peripheral surface a flange 118b which is engageable with a shoulder portion formed on an inner surface of the bore 118d. A large-diameter portion of a valve rod 14 is slidably disposed in the hole 118a of the control piston 118, and the valve rod 14 is restricted from moving toward the master piston 11 by a retainer 16 mounted on the control piston 118.

The master piston 11 has a pair of holes 11a, 11b extending axially from its opposite ends toward its center, and a hole 11c formed radially and communicated with the hole 11a via a small hole 11d. A valve member 14a mounted on one end of the valve rod 14 is slidably received in the hole 11a of the master piston 11 in opposing relation to the small hole 11d, and the valve member 14a is restricted from moving toward the control piston 118 by a retainer 15 mounted on the master piston 11.

A return spring 17 is mounted between the retainers 15 and 16 so as to normally bias the master piston 11 and the control piston 118 away from each other. Therefore, the opposite ends of the valve rod 14 are normally in engagement with the respective retainers 15, 16. Thus, the valve member 14a and the small hole 11d are spaced from each other, brake fluid supplied from the reservoir 41 to the fluid chamber 13 via the port 13a is filled in the pressure chamber 12 via the holes 11c, 11d and 11a of the master piston 11. When the master piston 11 is moved toward the control piston 118 against the biasing force of the return spring 17, the valve member 14a shuts off the small hole 11d so that the pressure chamber 12 is held in the closed state except the port 12a. Accordingly, the pressure of the brake fluid is raised in response to movement of the master piston 11. The control piston 118 also slides to some extent in response to movement of the master piston 11. This operation will be described in detail later in connection with the regulator 130.

Next, the hydraulic booster 20 is described below together with a braking force input mechanism.

In a housing 1b joined with the housing 1a, a boost chamber 20a and a low-pressure chamber 20b of the hydraulic booster 20 are defined, and a power piston 5 is fluid-tightly and slidably disposed in a bore 20c which is formed between the boost chamber 20a and the low-pressure chamber 20b, and which is substantially coaxial with the cylinder bore 10a. The power piston 5 is provided with a retainer 6 at its end extending toward the brake pedal 2, and a spring 6a is mounted between the retainer 6 and the housing 1b so as to normally bias the power piston 5 toward the brake pedal 2. The power piston 5 has at its middle portion a shoulder portion which abuts on the housing 1b to restrict the power piston 5 from sliding toward the brake pedal 2.

In the power piston 5 a recess 5a is formed at the end facing the master piston 11, and a stepped bore is formed axially in the center. This stepped bore comprises a small-diameter bore 5b, an intermediate-diameter bore 5c, a large-diameter bore 5d and an open end bore 5e. In the stepped bore, received slidably are a reaction rod 22r received in the small-diameter bore 5b, and a reaction piston 22 which has a small-diameter portion received in the intermediate-diameter bore 5c and a large-diameter portion received in the large-diameter bore 5d. The axial length of the reaction rod 22r is larger than the length of the small-diameter bore 5b of the stepped bore. In the reaction piston 22, formed is an elongated hole 22a extending coaxially with the axis of the reaction piston 22, and a through-hole 22b extending perpendicularly to the elongated hole 22a. A pin 5h fixed to the power piston 5 is disposed in the elongated hole 22a, so that the reaction piston 22 is restricted from sliding at least toward the brake pedal 2 with respect to the power piston 5.

The large-diameter portion of the reaction piston 22 is provided with a recess at its end. One end of an input rod 3 is connected to the brake pedal 2, and the other end of the input rod 3 is provided with a spherical head which is inserted in the open end bore 5e of the power piston 5 and received in the recess of the reaction piston 22, and which is engaged with the projection formed on the inner surface of the recess. In the power piston 5 formed radially is a through-hole 5f which is aligned with the through-hole 22b when the reaction piston 22 is positioned most closely to the brake pedal 2 and which is larger in diameter than the through-hole 22b.

Between the intermediate-diameter bore 5c and the reaction rod 22r, an annular space is defined due to the difference in axial length between the reaction rod 22r and the small-diameter bore 5b, and is communicated with the low-pressure chamber 20b through an inclined hole 5g. The large-diameter end portion of the output rod 4 is received in the recess 5a of the power piston 5 via an elastic reaction disk 4a and is held in the recess 5a with a leaf spring for instance urged. There exist normally a gap between the reaction disk 4a and the end of the reaction rod 22r. The output rod 4 is disposed in the hole 11b of the master piston 11, and the head of the output rod 4 is in contact with the bottom surface of the hole 11b.

A support lever 24 is pivotally connected at its one end to the housing 1b by a pin 1c for pivotal movement within the boost chamber 20a, and a spherical head of the support lever 24 is fitted into the through-hole 22b of the reaction piston 22. A control lever 25 pivotally connected with the support lever 24 by a pin 24a approximately in its center, and one head of the control lever 25 is fitted into the through-hole 5f of the power piston 5. Accordingly, when the reaction piston 22 slides toward the output rod 4 with respect to the power piston 5 which is pressed toward the brake pedal 2, a rotating force is exerted on the support lever 24 so as to pivotally move the support lever 24 clockwise about the pin 1c. At than time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to movement of the reaction rod 22r until it comes into contact with the reaction disk 4a.

The housing 1b has a spool-valve bore extending substantially in parallel with the power piston 5 and communicating with the boost chamber 20a, and a spool valve 28 is fitted into the spool-valve bore. The spool valve 28 has a spool 26 slidably received in a spool bore 27a formed in a cylinder 27 substantially in parallel with the power piston 5, and one end of the spool bore 27a is fluid-tightly plugged by a closure member 27f. In the spool 26, formed axially is a through-hole 26a, and formed radially a hole 26b communicating with the through-hole 26a. One end of the spool 26 is positioned in the boost chamber 20a and is connected to one end of a control rod 29. The other end of the control rod 29 is slidably mounted on a recess formed in the housing 1b, and the head of the control lever 25 is fitted into a through-hole 29a radially bored in the control rod 29. Between the cylinder 27 and a retainer 29b formed at one end of the control rod 29, a spring 29c is mounted so as to normally bias the spool 26 toward the control lever 25. The through-hole 26a normally opens to the boost chamber 20a at the junction of the spool 26 and the control rod 29.

When the control lever 25 is in its initial position, the through-hole 26a of the spool 26 is communicated with the reservoir 41 and the low-pressure chamber 20b through a hole 27b radially bored in the cylinder 27, a hole 27d communicating with the hole 27b via the peripheral groove formed around the outer surface of the cylinder 27, and the corresponding ports formed in the housing 1b. Thus, the boost chamber 20a is also communicated with the reservoir 41 and is filled with the brake fluid under the atmospheric pressure. A hole 27c communicating with the power source 40 is formed in the cylinder 27 with a predetermined distance from the hole 27b toward the control rod 29. The hole 27c is normally closed by the peripheral surface of the spool 26. Between the hole 27c and the one end of the spool 26 facing the control rod 29, an annular groove 27e is formed on the inner surface of the cylinder 27, and an annular groove 26c is formed on the peripheral surface of the spool 26 in opposing relation to the annular groove 27e.

When the spool 26 is moved toward the closure member 27f in response to movement of the control lever 25, the hole 27b of the cylinder 27 is closed. The hole 27c in turn faces the annular groove 26c of the spool 26, and the annular groove 27e faces the annular groove 26c and the hole 26b. Consequently, the hole 27c is communicated with the through-hole 26a. Accordingly, the hydraulic power pressure of the power source 40 is introduced into the boost chamber 20a to increase the hydraulic pressure therein, and the reaction force is thereby transmitted to the brake pedal 2 via the reaction piston 22, and at the same time the raised hydraulic pressure is applied to the master piston 11 via the power piston 5. The power piston 5 moves until the pin 5h comes into contact with the elongated hole 22a at maximum with respect to the reaction piston 22. Thereby, the relative position of the control lever 25 and the support lever 24 becomes that in its initial state. Accordingly, the control lever 25 is moved clockwise about the pin 24a to retract the control rod 29 toward the brake pedal 2. The hole 27c of the cylinder 27 is thereby closed, and in turn the hole 27b is communicated with the hole 26a of the spool 26 to lower the hydraulic pressure in the boost chamber 20a so that the power piston 5 is moved toward the brake pedal 2. With this operation performed repeatedly, the hydraulic pressure within the boost chamber 20a is regulated to a predetermined boost pressure.

The regulator 130, which is disposed in the housing 1a in series with respect to the master cylinder 10 via the control piston 118, is described below. The regulator 130 regulates the hydraulic power pressure supplied from the power source 40 in cooperation with the control piston 118 to a value substantially equal to the hydraulic pressure generated in the pressure chamber 12 of the master cylinder 10 and generates the regulated hydraulic pressure of that value.

The housing 1a is formed with a regulator bore 130a which is formed in coaxial relationship with the cylinder bore 10a and communicates therewith. A cylinder 131 is fitted into the regulator bore 130a and defines with the control piston 118 a regulator chamber 130b which communicates with a passage 72 through a port 138. The control piston 118 is formed with a passage 118c, one end of which opens to the regulator chamber 130b and the other end of which opens to a peripheral groove formed around a peripheral surface of the control piston 118. This peripheral groove is communicated with a port 110c which is communicated with the reservoir 41, so that the regulator chamber 130b is normally communicated with the reservoir 41 through the passage 118c. A bore 131a is formed axially in the cylinder 131 and a port 131c is formed radially and communicated with the bore 131a. The bore 131a is plugged by a plug member 131g at its one end, and communicated with the regulator chamber 130b through a hole 131b. The port 131c is connected to the power source 40 through a check valve 136.

A spherical valve member 131e is accommodated in the bore 131a, and biased in a direction to close the hole 131b by a spring 131f one end of which is mounted on the cylinder 131. The cylinder 131 has a cylinder extension 131d extending from its one end surface toward the control piston 118 with a clearance between its outer peripheral surface and the inner surface of the regulator bore 130a. Within this clearance, a spring 135 is mounted between the cylinder 131 and the control piston 118 which is biased toward the master cylinder 10. A plunger 132 is axially slidably disposed in the bore of the cylindrical portion 131d, and biased by the spring 134 toward the control piston 118 and blocked at a top end portion of the cylindrical extension 131d.

The plunger 132 has at its one end a protrusion 132a which faces the hole 131b and which is smaller in diameter and longer in length than the hole 131b. The plunger 132 has at its other end a valve member 133 which faces an open end of the passage 118c formed in the control piston 118. Although the bore in the cylindrical extension 131d is divided into two chambers by the plunger 132, these two chambers are communicated each other through a hole 132b formed in the plunger 132.

Accordingly, when the master cylinder 10 is not actuated, the flange portion 118b of the control piston 118 abuts on the shoulder portion formed on the inner surface of the bore 118d. In this position of the control piston 118, the passage 118c is communicated with the regulator chamber 130b and the valve member 131e is seated on the hole 131b, so that the brake fluid within the regulator chamber 130b is under the atmospheric pressure as in the reservoir 41. When the master cylinder 10 is actuated and the control piston 118 is moved toward the regulator 130, the open end portion of the passage 118c abuts on the valve member 133 so that the passage 118c is closed. Accordingly, the communication between the regulator chamber 130b and the reservoir 41 is blocked. In accordance with further movement of the control piston 118, the protrusion 132a of the plunger 132 abuts on the spherical valve member 131e and forces it away from the hole 131b, so that the regulator chamber 130b is communicated with the bore 131a. Accordingly, the regulator chamber 130b is applied with the hydraulic power pressure supplied from the power source 40, and the hydraulic pressure in the regulator chamber 130b increases.

When the hydraulic pressure in the regulator chamber 130b exceeds the hydraulic pressure in the pressure chamber 12 of the master cylinder 10, the control piston 118 is forced to move toward the master cylinder 10. By this movement of the control piston 118, the plunger 132 departs from the spherical valve member 131e so that the hole 131b is closed and then the open end portion of the passage 118c departs from the valve member 133, whereby the regulator chamber 130b is communicated with the reservoir 41. Accordingly, the hydraulic pressure in the regulator chamber 130b decreases. When this hydraulic pressure becomes less than the hydraulic pressure in the pressure chamber 12 of the master cylinder 10, the control piston 118 moves toward the regulator valve 130 and the aforementioned operation is performed. With the above operation performed repeatedly, the hydraulic pressure in the regulator chamber 130b is regulated into the regulated hydraulic pressure which is approximately same as the hydraulic braking pressure applied to the control piston 118 by the master cylinder 10.

The above described embodiment of the hydraulic braking system operates as follows. FIG. 2 illustrates the hydraulic braking system when the brake pedal 2 is not depressed. In this condition, the pressure chamber 12 of the master cylinder 10 is communicated with the fluid chamber 13, and is also communicated with the wheel brake cylinders 51a, 52a of the road wheels 51, 52. Thus, the brake fluid filled in the wheel brake cylinders 51a, 52a is under a pressure equal to the pressure within the reservoir 41, namely, substantially under the atmospheric pressure. On the other hand, the hydraulic power pressure of the power source 40 is supplied to the hole 27c of the hydraulic booster 20 and the hole 131c of the regulator 130 via the check valve 136 as well. In this condition, since the hole 27c is closed, the hydraulic booster 20 is inoperative.

When the brake pedal 2 is depressed, the reaction piston 22 is pushed via the input rod 3. And, when the reaction piston 22 is moved until the reaction rod 22r abuts on the reaction disk 4a of the power piston 5, the control lever 25 is rotated counterclockwise about the pin 24a with respect to the support lever 24 so that the head of the control lever 25 pushes the spool 26. Thereby, the hydraulic power pressure from the power source 40 is introduced into the boost chamber 20a to push the power piston 5 so as to apply the boost force to the master piston 11 so that the reaction force is transmitted to the brake pedal 2 via the reaction piston 22. In the boost chamber 20a, the hydraulic pressure is kept in the predetermined boost pressure with the spool valve 28 operated by the control lever 25 in response to relative displacement of the power piston 5 to the reaction piston 22.

The force pressing the power piston 5 toward the master cylinder 10 is transmitted to the master piston 11 via the output rod 4, and the master piston 11 slides toward the regulator 130. Then, the control piston 118 is pressed and moved toward the regulator 130 with the space between the master piston 11 and the control piston 118 held in their original state by means of the return spring 17. In accordance with this movement of the control piston 118, the passage 118c is closed by the valve member 133 and the plunger 132 is pressed to open the hole 131b. Accordingly, the regulator chamber 130b is applied through the port 131c with the hydraulic power pressure which is applied to the wheel brake cylinders 53a, 54a so that the road wheels 53, 54 are braked. During this operation, the hydraulic braking pressure is not generated in the master cylinder 10 because the volume of the pressure chamber 12 in the master cylinder 10 is not varied. Namely, the regulator 130 precedes the master cylinder 10 to generate the hydraulic pressure and apply it to the wheel brake cylinders 53a, 54a.

When the master piston 11 is moved further toward the regulator 130 against the biasing force of the return spring 17 to reduce the volume of the pressure chamber 12, the master cylinder 10 starts generating the hydraulic braking pressure. That is, the valve member 14a is seated on the open end of the small hole 11d, so that the pressure chamber 12 is closed. Then, in accordance with the reduction of the volume of the pressure chamber 12, the hydraulic braking pressure is applied from the port 12a to the wheel brake cylinders 51a, 52a, so that the road wheels 51, 52 are braked.

When the hydraulic pressure within the pressure chamber 12 is increased in response to movement of the master piston 11, the valve rod 14 slides in the hole 118a so that the hydraulic pressure within the regulator chamber 130b and the hydraulic pressure within the pressure chamber 12 are separated by sealing members mounted on the control piston 118 to provide a balance in pressure between the two chambers (except the difference in biasing force between the return spring 17 and the spring 135). Therefore, when the hydraulic pressure in the pressure chamber 12 is increased, the plunger 132 is moved toward the closure member 131g to introduce the hydraulic power pressure and raise the pressure in the regulator chamber 130b. On the contrary, when the hydraulic pressure in the regulator chamber 130b is larger than the hydraulic pressure in the pressure chamber 12, the plunger 132 is moved reversely to communicate with the reservoir 41 through the hole 118c so as to lower the hydraulic pressure in the regulator chamber 130b. Thus, the hydraulic pressure in the pressure chamber 12 and the hydraulic pressure in the regulator chamber 130b are regulated substantially to a common value. When releasing the braking force, the system is operated in the reverse manner.

In the above-described embodiment, since the return spring 17 is mounted between the master piston 15 and the control piston 118, a build up time of the regulated hydraulic pressure is shorter than that of the hydraulic braking pressure in the master cylinder 10. A gradient of transition of the output pressure, i.e. the regulated hydraulic pressure is effectively set up by employing an appropriate spring constant for the return spring 17.

Figure 3:
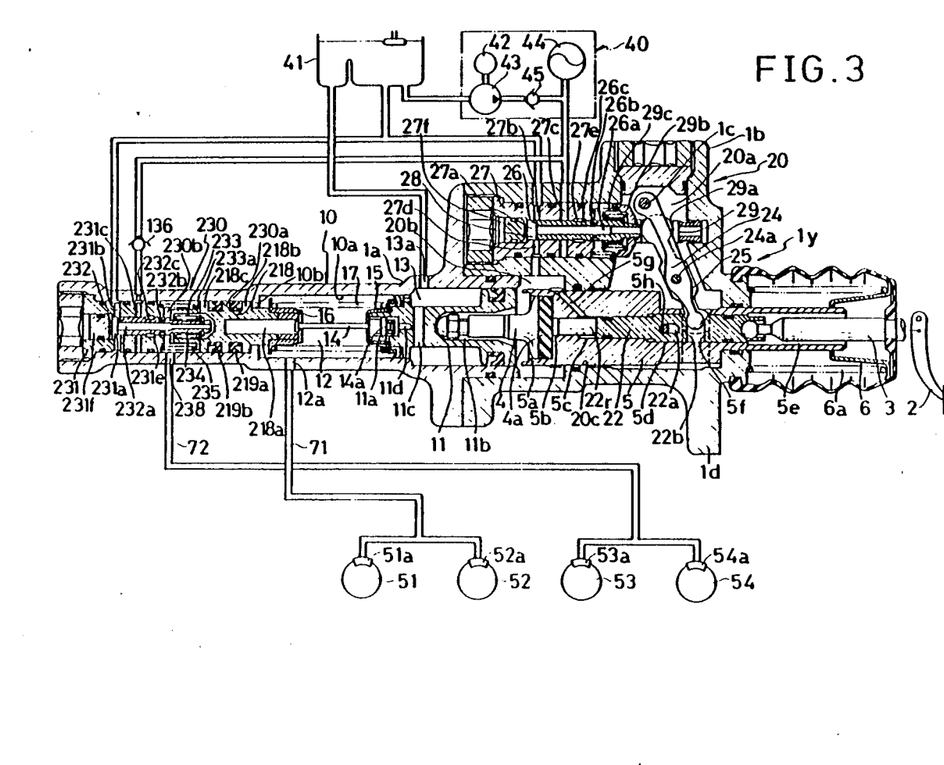
FIG. 3 is a schematic illustration of a hydraulic braking system of a third embodiment of the present invention with a sectional view of a hydraulic pressure generator thereof.

FIG. 3 shows a third embodiment of the present invention which is characterized in a pressure generator 1y which has a regulator 230 and a control piston 218 which correspond to the regulator 130 and the control piston 118 in FIG. 2 respectively.

The control piston 218 is disposed between the master cylinder 10 and the regulator 230, and is fluid-tightly and slidably disposed in a regulator bore 230a which is communicated with the cylinder bore 10a. The control piston 218 faces the pressure chamber 12 at its one end and faces a regulator chamber 230b at the other end. The control piston 218 has a hole 218a formed axially and opens to its one end facing the cylinder bore 10a and on its periphery a flange 218b which is engageable with a radially inwardly directed projection 10b formed on an inner surface of the cylinder bore 10a, so that the control piston 218 is prevented from sliding into the cylinder bore 10a. A large-diameter portion of a valve rod 14 is slidably disposed in the hole 218a of the control piston 218, and the valve rod 14 is restricted from moving toward the master piston 11 by a retainer 16.

The control piston 218 has a recess on its other end facing the regulator 230 for receiving a head of a spool 232 with a space, and has also a flange 218c on its periphery. Sealing members 219a, 219b are disposed between the flanges 218b and 218c. The return spring 17 is mounted between the retainers 15 and 16 so as to normally bias the master piston 11 and the control piston 218 away from each other.

The regulator 230 is similar to the spool valve 28 in the hydraulic booster 20. A cylinder 231 is fitted into the regulator bore 230a communicating with the cylinder bore 10a in the housing 1a, and a spool 232 is slidably received in the spool bore 231a formed in axial alignment with the axis of the master piston 11, and one end of the spool bore 231a is fluid-tightly plugged by a closure member 231f. A regulator chamber 230b is defined by the cylinder 231 and the control piston 218 in the regulator bore 230a, and communicated with the passage 72 through a port 238.

The spool 232 has a through-hole 232a axially formed therein, and a hole 232b radially formed therein and communicated with the through-hole 232a. One end of the spool 232 is positioned in the regulator chamber 230b, so that the through-hole 232a opens to the regulator chamber 230b and faces the control piston 218. A stepped portion is formed on a peripheral surface of the spool 232 in its approximately central portion, and a bottom portion of a retainer 233 is engaged with the stepped portion and biased toward the stepped portion by a spring 234 mounted on the distal end of the spool 232. A spring 235 is mounted between a flange 233a of the retainer 233 and the cylinder 231 so as to normally bias the retainer 233 toward the control piston 218 so that the spool 232 is biased in the same direction.

The flange 233a of the retainer 233 normally abuts on the flange 218c of the control piston 218. When the master cylinder 10 is inoperative, the flange 218b abuts on the projection 10b. In this condition, the through-hole 232a of the spool 232 is communicated with the reservoir 41 via the hole 231b formed in the cylinder 231 and the port formed in the housing 1a. Therefore, the brake fluid within the regulator chamber 230b is under the atmospheric pressure as in the reservoir 41. A hole 231c communicating with the power source 40 via a check valve 136 is formed radially in the cylinder 231 and spaced a predetermined distance from the hole 231b. The hole 231c is normally closed by the peripheral surface of the spool 232. An annular groove 231e is formed between the hole 231c and the one end of the spool 232 facing with the control piston 218, and an annular groove 232c is formed on the peripheral surface of the spool 232 in opposing relation to the annular groove 231e.

When the spool 232 slides toward the closure member 231f in response to movement of the control piston 218 via the retainer 233, the hole 231b of the cylinder 231 is closed. At the same time, the hole 231c faces the annular groove 232c of the spool 232, and the annular groove 231e faces the annular groove 232c and the hole 232b. Thus, the hole 231c is communicated with the through-hole 232a. That is, the hydraulic power pressure of the power source 40 is introduced into the regulator chamber 230b, and this hydraulic power pressure is applied to the control piston 218 to move the latter away from the cylinder 231. Accordingly, the hole 231c of the cylinder 231 is closed, and in turn the hole 231b is communicated with the through-hole 232a of the spool 232 to lower the hydraulic pressure in the regulator chamber 230b so that the spool 232 is moved toward the closure member 231f when the hydraulic pressure in the pressure chamber 12 applied to the control piston 218 is larger than the hydraulic pressure in the regulator chamber 230b. With this operation performed repeatedly, the hydraulic pressure in the regulator chamber 230b is regulated to a pressure substantially equal to the hydraulic pressure in the pressure chamber 12 applied to the control piston 218.

Operation of the regulator 230 and the control piston 218 in the embodiment shown in FIG. 3 is described below.

The force pressing the power piston 5 toward the master cylinder 10 is transmitted to the master piston 11 via the output rod 4, and the master piston 11 slides toward the regulator 230. The pressing force is thereby transmitted to the control piston 218 via the return spring 17, so that the hydraulic power pressure is supplied to the regulator chamber 230b from the hole 231c and then applied to the wheel brake cylinders 53a, 54a. As a result, the road wheels 53, 54 are braked. Simultaneously, the valve member 14a shuts up the small hole 11d to fluid-tightly close the pressure chamber 12, so that as the volume of the brake fluid within the pressure chamber 12 is compressed, the hydraulic braking pressure is generated from the port 12a and then applied to the wheel brake cylinders 51a, 52a. Accordingly, the road wheels 51, 52 are braked.

The hydraulic pressure in the regulator chamber 230b and the hydraulic pressure in the pressure chamber 12 are separated by the sealing members 219a, 219b disposed between the two flanges 218b and 218c of the regulator piston 218. When the hydraulic pressure in the pressure chamber 12 is increased in response to movement of the master piston 11, the valve rod 14 slides in the hole 218a so as to balance in pressure between the pressure chamber 12 and the regulator chamber 230b (except the difference in biasing force between the return spring 17 and the spring 235). Therefore, when the hydraulic pressure in the pressure chamber 12 is increased, the spool 232 is moved toward the closure member 231f to introduce the hydraulic power pressure and raise the hydraulic pressure in the regulator chamber 230b. On the contrary, when the hydraulic pressure in the regulator chamber 230b is larger than the hydraulic pressure in the pressure chamber 12, the spool 232 is moved reversely to communicate with the reservoir 41 to lower the hydraulic pressure. Thus, the hydraulic pressure in the regulator chamber 230b is regulated substantially to a common value with the hydraulic pressure in the pressure chamber 12. When releasing the braking force, the regulator 230 and others are operated in the reverse manner.

Then, in case that the hydraulic braking pressure of the master cylinder 10 becomes less than a predetermined value or disappears by some reason and hence the master cylinder 10 becomes inoperative, the master cylinder 11 is pressed toward the regulator 230 when the brake pedal 2 is depressed. Supposing that the biasing force of the return spring 17 is larger than that of the spring 235, due to the difference in biasing force between the return spring 17 and the spring 235, the control piston 218 is moved so as to force the retainer 233 to move the spool 232. In case that the biasing force of the spring 235 is larger than that of the return spring 17, the control piston 218 is moved after the return spring 17 has been compressed so as to balance with the biasing force of the spring 235. In general, the biasing force of the return spring 17 is designed to be larger than that of the spring 235. If the brake pedal 2 is depressed strongly in the above condition, the master piston 11 is pressed on a stretch against the biasing force of the return spring 17 and the spring 235, so that a sudden great force is applied to the control piston 218, since there exists no hydraulic pressure in the pressure chamber 12.

As the flange 233a of the retainer 233 abuts on the flange 218c of the control piston 218, the pressing force is transmitted to the spool 232 with their outer surfaces contacted each other. Therefore, the pressing force in this embodiment is reduced comparing with the case where the head of the spool 232 abuts directly on the master piston 11, to the extent of the rate in inverse proportion of the sectional area of the contacting portion of the master piston 11 to the sectional area of the head of the spool 232. Thus, the hydraulic pressure generated from the port 238 of the regulator 230 is applied to the wheel brake cylinders 53a, 54a without sudden rise of the hydraulic pressure. At that time, the output gradient of the regulated hydraulic pressure of the regulator 230 with respect to the depressing force of the brake pedal 2 can be determined as desired by selecting the size of the control piston 218 and the retainer 233a. For example, by making the control piston 218 different in diameter between its one end portion facing the regulator chamber 230b and the other end portion facing the pressure chamber 12, it is possible to modify the standard value for determining the hydraulic pressure to be generated. It is also possible to modify the output gradient by changing the contact area of the control piston 218 with the retainer 233.

The remaining construction and operation are the same a those of the second embodiment shown in FIG. 2. In the above embodiment shown in FIG. 3, for the booster 20 employed is that of the hydraulic pressure type so that both of the booster 20 and the regulator 230 are operated with the hydraulic pressure, but that of the vacuum type as shown in FIG. 1 may be employed.

According to the hydraulic braking system of the above embodiments shown in FIGS. 2 and 3, since the hydraulic pressure is some of the wheel brake cylinders are controlled by the regulator, the stroke of the brake pedal is shortened. Further, since the regulator and the master cylinder are connected through the control piston disposed therebetween, the regulator chamber and the pressure chamber are hydraulically separated from each other reliably, thus enabling the dual circuits braking system to be stable. In case that a spool valve is used in the regulator as in FIG. 3, smooth operation of the regulator can be achieved by the spool provided with the retainer which abuts on the control piston. Moreover, when the hydraulic pressure in the master cylinder disappears, it is possible to obtain an appropriate rise of the hydraulic pressure in the regulator with respect to the input braking force.

Figure 4:
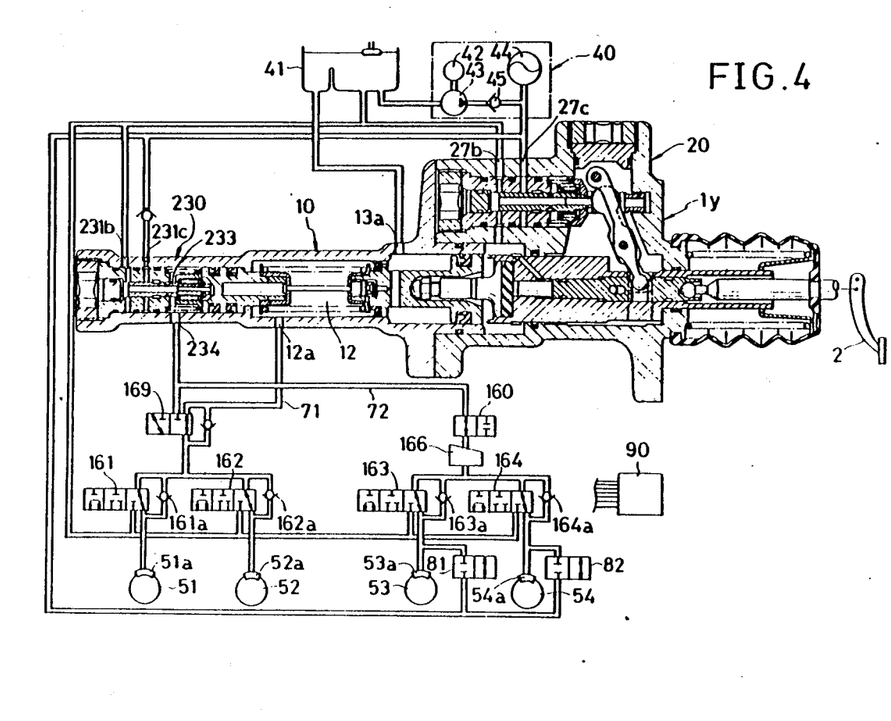
FIG. 4 is a schematic illustration of a hydraulic braking system of a fourth embodiment of the present invention with a sectional view of a hydraulic pressure generator thereof.

FIG. 4 shows a fourth embodiment of the present invention, in which the pressure generator 1y is the same as that of the third embodiment shown in FIG. 3 and operates in the same manner. In this embodiment, an apparatus for the anti-locking operation and the anti-slip operation as described in the first embodiment shown in FIG. 1 is equipped. In this embodiment, driven wheels of the vehicle are the road wheels 53, 54 in FIG. 4.

The pressure chamber 12 is communicated, through the port 12a, with the wheel brake cylinders 51a, 52a via a changeover valve 169 and control valves 161, 162.

The regulator 230 is communicated through the port 234 with the wheel brake cylinders 53a, 54a via a normally open valve means or a changeover valve 160, a proportioning valve 166 and control valves 163, 164. The changeover valve 160 is a two ports-two positions solenoid operated valve which is electrically connected to a controller 90 and actuated by a solenoid coil energized in response to the electric control signal from the controller 90 which functions in substantially same manner as the controller 70 shown in FIG. 1.

The changeover valve 160 is normally in its deenergized position so as to open the passage 72. The changeover valve 169 is a three ports-two positions solenoid operated directional control valve which is connected to the controller 90 and disposed between the passages 71 and 72, and which is provided with a check valve for fast return of brake fluid from the control valves 161, 162 to the master cylinder 10. The changeover valve 169 normally communicates the control valves 161, 162 with the port 12a and in its energized position closes the passage 71 and communicates them with the port 234.

The control valves 161 to 164 are three ports-three positions solenoid operated valves, in each of which one of the passages 71, 72 is communicated with the corresponding one of the wheel brake cylinders 51a to 54a respectively is a first operating position, the communication therebetween is blocked in a second operating position, and each of the wheel brake cylinders 51a to 54a is communicated with the reseivoir 41 in a third operating position, with their communication with the passages 71, 72 blocked. The control valves 161 to 164 are arranged to be operated in response to the electric control signal from the controller 90. The check valves 161a to 164a disposed in parallel with the control valves 161 to 164 function in the same manner as the check valve disposed in parallel with the changeover valve 169.

The anti-locking apparatus in this embodiment comprises the control valves 161 to 164, the changeover valve 169 and the controller 90. Thereby the hydraulic pressure applied to each of the wheel brake cylinders 51a to 54a is increased, decreased or held depending on a locking condition of the road wheels 51 to 54 to effectively prevent them from locking. In the passage 72 disposed is a well known proportioning valve 166 by which the hydraulic pressure applied to the road wheels 53, 54 is reduced at a predetermined rate with respect the hydraulic braking pressure applied to the road wheels 51, 52 for ensuring an ideal distribution of the braking force in the front and rear road wheels.

For providing the anti-slip operation in the above apparatus, there are disposed normally open valve means or changeover valves 81, 82 in passages connected to the connecting passages between the wheel brake cylinders 53a, 54a and the control valves 163, 164 respectively. The changeover valves 81, 82 are also connected to the power source 40. The changeover valves 81, 82 are two ports-two positions solenoid operated valves of normally open type which normally close the passages and open them when energized. When the changeover valve 160 is operated, the passage 72 is closed so that the anti-slip operation is achieved with the changeover valves 81, 82 operated in response to the control signal from the controller 90. The changeover valves 81, 82 may be later installed on a vehicle having the control valves 161 to 164, as optional parts, near the wheel brake cylinders 53a, 54a of driven road wheels.

In operation, in the normal condition of the braking system described above, the changeover valves 160, 169 and the control valves 161 to 164 are positioned as shown in FIG. 4, so that the road wheels 51, 52 are braked by the hydraulic braking pressure applied from the master cylinder 10 in response to depression of the brake pedal 2, and the road wheels 53, 54 are braked by the regulated hydraulic pressure applied from the regulator 230 in response to the hydraulic pressure in the master cylinder 10. When an excessive amount of slip of the road wheels is detected and the anti-locking operation is initiated by the controller 90, all of the control valves 61 to 64 are applied with the regulated hydraulic pressure through the port 234, and the three positions in each of the control valves 61 to 64 are selectively positioned depending upon the locking condition of the road wheels 51 to 54.

When an excessive amount of slip of the road wheels 53, 54, i.e. driven wheels, is detected in starting or accelerating operation, the changeover valve 160 is operated to close the passage 72, and the changeover valves 81, 82 are operated to apply to the wheel brake cylinders 53a, 54a the hydraulic power pressure generated from the power source 40. Accordingly, the road wheels 53, 54 are braked to prevent the slip thereof irrespective of operation of the brake pedal 2, with the changeover valves 81, 82 and the control valves 163, 164 operated depending upon the slip condition. The changeover valves 81, 82 may be operated independently.

Figure 5:
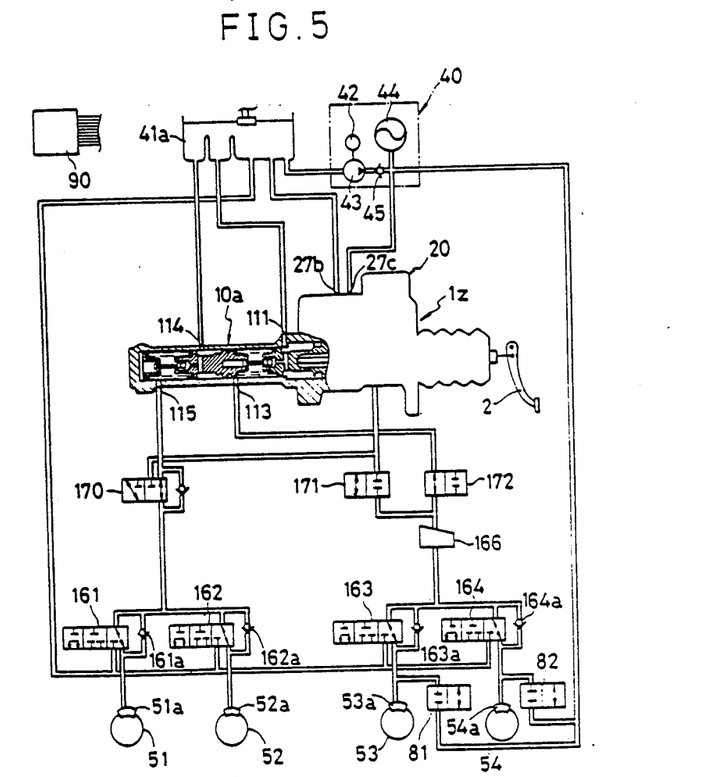
FIG. 5 is a schematic illustration of a hydraulic braking system of a fifth embodiment of the present invention.

FIG. 5 shows another embodiment of the braking system equipped with the changeover valves 81, 82 for the anti-slip operation. In this embodiment, a tandem master cylinder 10a is employed in a pressure generator 1z in lieu of the master cylinder 10 and the regulator 230 shown in FIG. 4, so that all of the road wheels 51 to 54 are braked normally by a hydraulic braking pressure applied from the tandem master cylinder 10a, and the anti-locking operation is achieved by a boost pressure generated in the hydraulic booster 230 in the slip condition when braked. For this purpose, a pair of changeover valves 171, 172 are disposed in lieu of the changeover valve 160 of the system shown in FIG. 4, and piping of passages is modified. The changeover valves 171, 172 are two ports-two positions solenoid operated valves which are normally positioned as shown in FIG. 5. The remaining construction is the same as that in FIG. 4 except a reservoir 41a, which is different in shape from the reservoir 41, inlet ports 111, 113 and outlet ports 114, 115 in the tandem master cylinder 10a, and a changeover valve 170 which corresponds to the changeover valve 169 in FIG. 4.

In operation of this embodiment, in the anti-locking operation, the boost pressure generated in the hydraulic booster 20 is applied to the wheel brake cylinders 51a to 54a with the changeover valves 170, 171 and 172 operated depending upon the locking condition. The operation of the control valves 161 to 164 is the same as in FIG. 4. The anti-slip operation is achieved by operating the changeover valves 81, 82 and the control valves 163, 164 depending upon the slip condition, with the changeover valve 172 in its operated position.

Accordingly, in the embodiments shown in FIGS. 4 and 5, the anti-slip apparatus is easily installed on a vehicle having the anti-locking apparatus by simply providing a pair of changeover valves near the wheel brake cylinders of the driven road wheels.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle, comprising:
   a power source for generating a hydraulic power pressure;
   a reservoir for storing an amount of hydraulic fluid;
   a master cylinder having a housing defining therein a bore, a master piston slidably disposed in said bore to form a pressure chamber for introducing said hydraulic fluid thereinto from said reservoir and generating a hydraulic braking pressure in response to depression of a brake pedal;
   a regulator having a housing defining therein a regulator chamber for introducing said hydraulic power pressure thereinto from said power source and regulating said hydraulic power pressure into a regulated hydraulic pressure in response to said hydraulic braking pressure generated in said master cylinder, said regulator being positioned in substantially coaxial relationship with said master cylinder and responsive mechanically to depression of said brake pedal;
   said regulator being arranged to control the communication of said regulator chamber with said power source and said reservoir normally in response to said hydraulic braking pressure generated in said master cylinder, and in response to depression of said brake pedal when said hydraulic braking pressure generated in said master cylinder is less than a predetermined value;
   a plurality of wheel brake cylinders for braking respective road wheels, said wheel brake cylinders being divided into a first group of wheel brake cylinders communicated with said pressure chamber of said master cylinder and a second group of wheel brake cylinders communicated with said regulator chamber,
   said regulator comprising a housing defining therein a bore coaxial with said pressure chamber of said master cylinder, a piston axially slidably disposed in said bore of said regulator to form a regulator chamber therein, and valve means disposed within said regulator chamber for controlling the communication of said regulator chamber with said power source and said reservoir in response to movement of said piston, said piston being applied at one end thereof with a hydraulic pressure in said regulator chamber and at the other end thereof with said hydraulic braking pressure in said master cylinder, said valve means normally allowing a flow of said hydraulic fluid from said reservoir into said regulator chamber, and said valve means inhibiting the flow of said hydraulic fluid from said reservoir and introducing said hydraulic power pressure into said regulator chamber when said hydraulic braking pressure in said master cylinder exceeds said hydraulic pressure in said regulator chamber.

2. A hydraulic braking system for an automotive vehicle as set forth in claim 1, wherein said master piston is arranged to abut on the other end of said piston of said regulator when said hydraulic braking pressure generated in said master cylinder is less than a predetermined value, so that said piston of said regulator is moved to activate said valve means for introducing said hydraulic power pressure into said regulator chamber in response directly to movement of said master piston operated by said brake pedal.

3. A hydraulic braking system for an automotive vehicle as set forth in claim 2, further comprising a power booster associated with said master piston for moving said master piston toward said regulator in response to depression of said brake pedal.

4. A hydraulic braking system for an automotive vehicle, comprising:
   a power source for generating a hydraulic power pressure;
   a reservoir for storing an amount of hydraulic fluid;
   a master cylinder having a housing defining therein a bore, a master piston slidably disposed in said bore to form a pressure chamber for introducing said hydraulic fluid thereinto from said reservoir and generating a hydraulic braking pressure in response o depression of a brake pedal;
   a regulator having a housing defining therein a regulator chamber for introducing said hydraulic power pressure thereinto from said power source and regulating said hydraulic power pressure into a regulated hydraulic pressure in response to said hydraulic braking pressure generated in said master cylinder, said housing of said regulator being integral with said housing of said master cylinder in substantially coaxial relationship therewith;
   a control piston slidably disposed between said regulator chamber of said regulator and said pressure chamber of said master cylinder, said control piston being applied at one end thereof with a hydraulic pressure in said regulator chamber and at the other end thereof with said hydraulic braking pressure in said master cylinder, so that said control piston disconnects the fluid communication between said regulator and said master cylinder;
   a plurality of wheel brake cylinders for braking respective road wheels, said wheel brake cylinders being divided into a first group of wheel brake cylinders communicated with said pressure chamber of said master cylinder and a second group of wheel brake cylinders communicated with said regulator chamber, and
   said regulator comprising a housing defining therein a bore coaxial with said pressure chamber of said master cylinder, in which said control piston is axially slidably disposed to form a regulator chamber, and valve means disposed within said regulator chamber for controlling the communication of said regulator chamber with said power source and said reservoir in response to movement of said control piston, said valve means normally allowing a flow of said hydraulic fluid from said reservoir into said regulator chamber and said valve means inhibiting the flow of said hydraulic fluid from said reservoir and introducing said hydraulic power pressure into said regulator chamber when said hydraulic braking pressure in said master cylinder exceeds said hydraulic pressure in said regulator chamber.

5. A hydraulic braking system for an automotive vehicle as set forth in claim 4, further comprising a return spring mounted between said master piston and said control piston for biasing said control piston away from said master piston and toward said regulator.

6. A hydraulic braking system for an automotive vehicle as set forth in claim 5, wherein said regulator chamber is formed, around the inner surface thereof, with a shoulder portion which is smaller in inner diameter than said regulator chamber and which abuts on a part of said control piston thereby to limit the movement of said control piston toward said master cylinder.

7. A hydraulic braking system for an automotive vehicle as set forth in claim 5, wherein said housing of said regulator has a partition wall provided with a hole and formed with a valve seat therearound, said housing being divided by said partition wall into a valve chamber communicated with said power source and said regulator chamber, and wherein said valve means comprises:
- a spherical valve member accommodated in said valve chamber and seated on said valve seat;
- a spring accommodated in said valve chamber for biasing said spherical valve member toward said valve seat;
- a plunger slidably received in said regulator chamber and provided with a protrusion at one end thereof facing said valve chamber and extending through said hole for abutting contact with said spherical valve member, said plunger being provided with a plug member at the other end thereof for blocking the communication between said regulator chamber and said reservoir; and
- a second spring accommodated in said regulator chamber for biasing said plunger away from said spherical valve member.

8. A hydraulic braking system for an automotive vehicle as set forth in claim 7, wherein said control piston is formed with a fluid passage, one open end of which is communicated with said reservoir, and the other open end of which is normally open to said regulator chamber and faces said plug member of said plunger whereby said other open end is shut off when said plug member is seated on said other open end.

9. A hydraulic braking system for an automotive vehicle as set forth in claim 5, wherein said valve means of said regulator comprises:
- a cylinder disposed in said bore of said regulator, said cylinder having a first port defined therein communicating with said reservoir and a second port communicating with said power source;
- a spool slidably received in said cylinder, said spool defining axially therein a through hole communicating with said regulator chamber and a radial hole communicating with said through hole, said through hole being selectively communicated with said first port or said second port via said radial hole in response to movement of said spool in said cylinder; and
- a retainer mounted on said spool having a flange portion slidably received in said bore of said regulator, said flange portion abutting on an end face of said control piston.

10. A hydraulic braking system for an automotive vehicle comprising:
- a power source for generating a hydraulic power pressure;
- a reservoir for storing an amount of hydraulic fluid;
- a master cylinder having a housing defining therein a bore, a master piston slidably disposed in said bore to form a pressure chamber for introducing said hydraulic fluid thereinto from said reservoir and generating a hydraulic braking pressure in response to depression of a brake pedal;
- a regulator having a housing defining therein a regulator chamber for introducing said hydraulic power pressure thereinto from said power source and regulating said hydraulic power pressure into a regulated hydraulic pressure in response to said hydraulic braking pressure generated in said master cylinder, said regulator being positioned in substantially coaxial relationship with said master cylinder and responsive mechanically to depression of said brake pedal;
- a plurality of wheel brake cylinders for having respective road wheels, said wheel brake cylinders being divided into a first group of wheel brake cylinders communicated with said pressure chamber of said master cylinder and a second group of wheel brake cylinders communicated with said regulator chamber; and
- a changeover valve selectively placed in one of a first operating position for communicating said first group of wheel brake cylinders with said pressure chamber and a second operating position for communicating said first group of wheel brake cylinders with said regulator chamber and blocking the communication between said first group of wheel brake cylinders and said pressure chamber.

11. A hydraulic braking system for an automotive vehicle as set forth in claim 10, further comprising a first pair of control valve means for controlling the communication between said changeover valve and each of said first group of wheel brake cylinders respectively, and the communication between said reservoir and each of said first group of wheel brake cylinders respectively, and a second pair of control valve means for controlling the communication between said regulator and each of said second group of wheel brake cylinders respectively, and the communication between said reservoir and each of said second group of wheel brake cylinders respectively.

12. A hydraulic braking system for an automotive vehicle as set forth in claim 11, further comprising a second changeover valve selectively placed in one of a first operating position for communicating said regulator with said reservoir and a second operating position for communicating said regulator with said power source and blocking the communication between said regulator and said reservoir.

13. A hydraulic braking system for an automotive vehicle as set forth in claim 11, further comprising normally open valve means disposed in a fluid passage connecting said regulator and said second pair of valve means for normally communicating said regulator with said second group of wheel brake cylinders via said second pair of valve means and blocking the communication therebetween when said normally open valve means is operated.

14. A hydraulic braking system for an automotive vehicle as set forth in claim 13, further comprising a power passage connecting said power source with each of said second group of wheel brake cylinders, and normally closed valve means disposed in said power passage for communicating said power source with said second group of wheel brake cylinders when said normally closed valve means is operated.

15. A hydraulic braking system for an automotive vehicle as set forth in claim 14, wherein said normally closed valve means includes a pair of two ports-two positions solenoid operated valves each of which is disposed in each of a pair of passages diverged from said power passage and connected to each of said second group of wheel brake cylinders respectively.

16. A hydraulic braking system for an automotive vehicle as set forth in claim 14, wherein said normally open valve means is arranged to be operated before said normally closed valve means is operated.

* * * * *